United States Patent
Kimpara et al.

(10) Patent No.: US 12,381,254 B2
(45) Date of Patent: Aug. 5, 2025

(54) SOLID ELECTROLYTE AND METHOD FOR PRODUCING SAME

(71) Applicant: IDEMITSU KOSAN CO., LTD., Tokyo (JP)

(72) Inventors: Hironari Kimpara, Sodegaura (JP); Shota Totsuka, Sodegaura (JP); Atsushi Sato, Sodegaura (JP); Naoya Masuda, Sodegaura (JP); Atsushi Yao, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 714 days.

(21) Appl. No.: 17/641,167

(22) PCT Filed: Sep. 18, 2020

(86) PCT No.: PCT/JP2020/035418
§ 371 (c)(1),
(2) Date: Mar. 8, 2022

(87) PCT Pub. No.: WO2021/054433
PCT Pub. Date: Mar. 25, 2021

(65) Prior Publication Data
US 2022/0344703 A1 Oct. 27, 2022

(30) Foreign Application Priority Data

Sep. 20, 2019 (JP) .................. 2019-172112
Dec. 16, 2019 (JP) .................. 2019-226488

(51) Int. Cl.
*H01M 10/0562* (2010.01)

(52) U.S. Cl.
CPC .......... *H01M 10/0562* (2013.01); *H01M 2300/0068* (2013.01)

(58) Field of Classification Search
CPC .................................. H01M 10/0562
See application file for complete search history.

(56) References Cited

U.S. PATENT DOCUMENTS

| | | |
|---|---|---|
| 2019/0312304 A1 | 10/2019 | Uesugi et al. |
| 2021/0013542 A1 | 1/2021 | Takahashi et al. |
| 2022/0059870 A1 | 2/2022 | Takahashi et al. |

FOREIGN PATENT DOCUMENTS

| | | | |
|---|---|---|---|
| JP | 2014093263 A | 5/2014 | |
| JP | 2017120728 A | 7/2017 | |

(Continued)

OTHER PUBLICATIONS

English translation of the International Preliminary Report on Patentability and Written Opinion issued Mar. 31, 2022 in PCT/JP2020/035418, 5 pages.

(Continued)

*Primary Examiner* — Karie O'Neill Apicella
(74) *Attorney, Agent, or Firm* — Element IP, PLC (57) ABSTRACT

A method of production of a solid electrolyte having an Argyrodite-type crystal structure, including steps of mixing raw materials such that lithium (Li), phosphorus (P), sulfur (S), oxygen (O), and halogen (X) satisfy the following formulas (11) to (14) to obtain a mixture; and heating the mixture:

$$4.8 \leq Li/P \leq 5.3 \quad (11)$$

$$3.8 \leq S/P \leq 4.4 \quad (12)$$

$$0 < O/P \leq 0.8 \quad (13)$$

$$1.0 < X/P \leq 2.0 \quad (14)$$

wherein the formula (11) represents a molar ratio of Li to P, the formula (12) represents a molar ratio of S to P, the (Continued)

formula (13) represents a molar ratio of O to P, and the formula (14) represents a molar ratio of halogen (X) to P.

16 Claims, 6 Drawing Sheets

(56)  References Cited

FOREIGN PATENT DOCUMENTS

| | | | |
|---|---|---|---|
| JP | 2017224474 A | 12/2017 | |
| JP | 2018029058 A * | 2/2018 | ............ C01B 25/14 |
| JP | 6293383 B1 | 3/2018 | |
| JP | 2018203569 A | 12/2018 | |
| JP | 2018206630 A | 12/2018 | |
| JP | 2019050182 A | 3/2019 | |
| WO | WO-2016067631 A1 | 5/2016 | |
| WO | WO-2019003986 A1 | 1/2019 | |
| WO | WO-2019131725 A1 | 7/2019 | |
| WO | WO-2019176895 A1 | 9/2019 | |

OTHER PUBLICATIONS

International Search Report issued Oct. 27, 2020 in PCT/JP2020/035418, 2 pages.
Office Action issued Jun. 18, 2024 in corresponding Japanese Patent Application No. 2021-546971 (with machine English translation), 10 pages.

* cited by examiner

SOLID ELECTROLYTE AND METHOD FOR PRODUCING SAME

TECHNICAL FIELD

The invention relates to a solid electrolyte and a method of production of the same.

BACKGROUND ART

A sulfide solid electrolyte is known to be degraded due to moisture in the air. On the other hand, for example, Patent Document 1 discloses a solid electrolyte containing $Li_{7-a}PS_{6-a}Ha_a$ having an Argyrodite-type crystal structure (Ha represents a halogen; a satisfies $0.2 < a \leq 1.8$) and $Li_3PS_4$ and characterized in that, in an X-ray diffraction (XRD) pattern obtained through measurement by an X-ray diffraction method, the ratio of the peak intensity of a peak appearing at a position in a range of diffraction angle $2\theta=26.0$ to $28.8°$ derived from $Li_3PS_4$, relative to the peak intensity of a peak appearing at a position in a range of diffraction angle $2\theta=24.9$ to $26.3°$ derived from the Argyrodite-type crystal structure, is 0.04 to 0.3. Patent Document 2 discloses a sulfide solid electrolyte characterized in that an alkaline compound is mixed in a solid electrolyte, and a ratio of a molar amount of an alkali metal contained in the alkaline compound to a molar amount of Li contained in the solid electrolyte is 1/1000 or more and 1/25 or less.

In addition, Patent Documents 3 and 4 respectively disclose a sulfide-based solid electrolyte particle containing lithium, phosphorus, sulfur, and halogen and having a cubic Argyrodite-type crystal structure, and a sulfide-based solid electrolyte for a lithium secondary battery having the surface coated with a compound having a non-Argyrodite-type crystal structure containing lithium, phosphorus, and sulfur.

RELATED ART DOCUMENTS

Patent Documents

[Patent Document 1] WO 2019/131725 A1
[Patent Document 2] JP 2017-120728 A
[Patent Document 3] WO 2019/176895 A1
[Patent Document 4] JP 6293383 B

SUMMARY OF THE INVENTION

The solid electrolytes of Patent Documents 1 to 4, have insufficient compatibility of the suppression of hydrogen sulfide generation and the ionic conductivity, so that further improvements are required.

It is an object of the invention to provide a solid electrolyte having high ionic conductivity while suppressing the generation of hydrogen sulfide and a method of production of the same.

According to one aspect of the invention, a method of production of a solid electrolyte having an Argyrodite-type crystal structure, including steps of: mixing raw materials such that lithium (Li), phosphorus (P), sulfur (S), oxygen (O), and halogen (X) satisfy the following formulas (11) to (14) to obtain a mixture; and heating the mixture is provided:

$$4.8 \leq Li/P \leq 5.3 \quad (11)$$

$$3.8 \leq S/P \leq 4.4 \quad (12)$$

$$0 < O/P \leq 0.8 \quad (13)$$

$$1.0 < X/P \leq 2.0 \quad (14)$$

wherein the formula (11) represents a molar ratio of Li to P, the formula (12) represents a molar ratio of S to P, the formula (13) represents a molar ratio of O to P, and the formula (14) represents a molar ratio of halogen (X) to P.

Further; according to one aspect of the invention, a solid electrolyte having an Argyrodite-type crystal structure containing lithium (Li), phosphorus (P), sulfur (S), oxygen (O), and halogen (X), wherein a proportion of a $Li_3PO_4$ crystal structure occupying in the entire crystals in the solid electrolyte is 0.1% by mass or more and 3.0% by mass or less, and lithium (Li), phosphorus (P), sulfur (S), oxygen (O), and halogen (X) satisfies the following formulas (21) to (23) is provided:

$$4.8 \leq Li/P \leq 5.3 \quad (21)$$

$$3.8 \leq S/P \leq 4.4 \quad (22)$$

$$1.0 < X/P \leq 2.0 \quad (23)$$

wherein the formula (21) represents a molar ratio of Li to P, the formula (22) represents a molar ratio of S to P, and the formula (23) represents a molar ratio of halogen (X) to P.

According to the invention, it is possible to provide a solid electrolyte having high ionic conductivity while suppressing the generation of hydrogen sulfide and a method of production of the same.

MODE FOR CARRYING OUT THE INVENTION

[First Aspect]
A method of production of a solid electrolyte according to one aspect of the invention including: the following mixing step and heating step to produce a solid electrolyte having an Argyrodite-type crystal structure.

Mixing step: a step of mixing raw materials such that lithium (Li), phosphorus (P), sulfur (S), oxygen (O), and halogen (X) satisfy the following formulas (11) to (14).

$$4.8 \leq Li/P \leq 5.3 \quad (11)$$

$$3.8 \leq S/P \leq 4.4 \quad (12)$$

$$0 < O/P \leq 0.8 \quad (13)$$

$$1.0 < X/P \leq 2.0 \quad (14)$$

wherein the formula (11) represents a molar ratio of Li to P, the formula (12) represents a molar ratio of S to P, the formula (13) represents a molar ratio of O to P, and the formula (14) represents a molar ratio of halogen (X) to P.

Heating step: heating the mixture obtained in the mixing step.

In this embodiment, by adjusting the composition of a starting material to the formulas (11) to (14), it is presumed that, unlike a conventional Argyrodite-type crystal structure, an Argyrodite-type crystal structure is formed in which the amount of sulfur ions ($S^{2-}$) in the crystal is reduced and the halogen ions ($Cl^-$, $Br^-$, etc.) are increased.

The Argyrodite-type crystal structure is a structure in which a $PS_4^{3-}$ structure is the main unit structure of the crystal skeleton, and the sites surrounding the main unit structure are occupied by $S_2^-$ surrounded by Li, and optionally by a halogen ion. The common Argyrodite-type crystal structure is a crystal structure shown by the space group F-43M. In the crystal structure, from the viewpoint of the crystallography, 4a sites and 4d sites are present around a $PS_4^{3-}$ structure, an element with a large ionic radius tends to occupy the 4a site, and an element with a small ionic radius tends to occupy the 4d site.

The unit lattice of an Argyrodite-type crystal structure has a total of eight 4a and 4d sites. The inventors of this specification have assumed that $S^{2-}$ occupying the site in an Argyrodite-type crystal structure be a cause of hydrogen sulfide generation, and found that the generation of hydrogen sulfide can be suppressed by relatively lowering the $S^{2-}$ content in the Argyrodite-type crystal structure.

On the other hand, it was confirmed that, when the amount of S in the starting material was simply reduced, some of S elements form a crystal phase other than an Argyrodite-type crystal such as $\beta$-$Li_3PS_4$, which is not an Argyrodite-type crystal structure, was generated during the heating step and as a result, the ionic conductivity was greatly reduced.

As a result of extensive studies by the inventors toward the solution of this problem, it has been found that, by setting the composition of the elements to the formulas (11) to (14), and making the starting material to contain O, the generation of a crystal phase other than an Argyrodite-type crystal such as $\beta$-$Li_3PS_4$ during the heating step is surprisingly suppressed, and the amount of the Argyrodite-type crystal structure in which the amount of $S^{2-}$ in the crystal is reduced can be increased, and as a result, a solid electrolyte having high ionic conductivity while sufficiently suppressing the generation amount of hydrogen sulfide can be obtained.

The formulas (11) to (14) in the mixing step preferably satisfy the following formulas.

$$4.85 \leq Li/P \leq 5.25$$

$$3.9 \leq S/P \leq 4.3$$

$$0.01 \leq O/P \leq 0.7$$

$$1.2 \leq X/P \leq 1.9$$

The formulas (11) to (14) in the mixing step more preferably satisfy the following formulas.

$$4.9 \leq Li/P \leq 5.2$$

$$4.0 \leq S/P \leq 4.2$$

$$0.05 \leq O/P \leq 0.6$$

$$1.4 \leq X/P \leq 1.8$$

The raw materials used in this embodiment are selected in combination of two or more compounds and/or simple substances such that the solid electrolyte to be produced contains elements as essential in a predetermined molar ratio. Specifically, two or more compounds and simple substances containing Li, P, S, O, and halogen (X) as a whole are used in combination.

Examples of the raw material containing lithium include lithium compounds such as lithium sulfide ($Li_2S$), lithium oxide ($Li_2O$), lithium carbonate ($Li_2CO_3$), and lithium hydroxide (LiOH), and a lithium metal simple substance. Among these, a lithium compound is preferred from the viewpoint of ease of handling and reactivity of the raw material, and more preferred is $Li_2S$.

Examples of the raw material containing phosphorus include, for example, phosphorus sulfide such as diphosphorus trisulphide ($P_2S_3$) and diphosphorus pentasulfide ($P_2S_5$), phosphorus compound such as sodium phosphate ($Na_3PO_4$), phosphorus simple substance, and the like. Among these, phosphorus sulfide is preferred from the viewpoint of ease of handling and reactivity, and diphosphorus pentasulfide ($P_2S_5$) is more preferred. Phosphorus compound such as diphosphorus pentasulfide ($P_2S_5$) and a phosphorus simple substance can be used without any particular limitation as long as it is produced industrially and commercially available.

As a raw material containing halogen (X), for example, at least one of a halogen compound represented by the formula ($M_l$-$X_m$) and a halogen simple substance is preferably used.

In the formula, M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a compound in which an oxygen element or a sulfur element is bonded to these elements, and M is preferably Li or P, and more preferably Li.

X is a halogen element selected from the group consisting of F, Cl, Br, and I.

In addition, l is an integer of 1 or 2, and m is an integer of 1 to 10. When m is an integer of 2 to 10, that is, when a plurality of X's is present, X's may be the same as or different from each other. For example, in the case of $SiBrCl_3$ mentioned later, m is 4, and X's are elements different from one another, for example, Br and Cl.

Specific examples of the halogen compound include sodium halides such as NaI, NaF, NaCl, and NaBr; lithium halides such as LiF, LiCl, LiBr, and LiI; boron halides such as $BCl_3$, $BBr_3$, $BI_3$; aluminum halides such as $AlF_3$, $AlBr_3$, $AlI_3$, and $AlCl_3$; silicon halides such as $SiF_4$, $SiCl_4$, $SiCl_3$, $Si_2Cl_6$, $SiBr_4$, $SiBrCl_3$, $SiBr_2Cl_2$, and $SiIo$; phosphorus halides such as $PF_3$, $PF_5$, $PCl_3$, $PCl_5$, $POCl_3$, $PBr_3$, $POBr_3$, $PI_3$, $P_2Cl_4$, and $P_2I_4$; sulfur halides such as $SF_2$, $SF_4$, $SF_6$, $S_2F_{10}$, $SCl_2$, $S_2Cl_2$, and $S_2Br_2$; germanium halides such as $GeF_4$, $GeCl_4$, $GeBr_4$, $GeI_4$, $GeF_2$, $GeCl_2$, $GeBr_2$, and $GeI_2$; arsenic halides such as $AsF_3$, $AsCl_3$, $AsBr_3$, $AsI_3$, and $AsF_5$; selenium halides such as $SeF_4$, $SeF_6$, $SeCl_2$, $SeCl_4$, $Se_2Br_2$, and $SeBr_4$; tin halides such as $SnF_4$, $SnCl_4$, $SnBr_4$, $SnI_4$, $SnF_2$, $SnCl_2$, $SnBr_2$, and $SnI_2$; antimony halides such as $SbF_3$, $SbCl_3$, $SbBr_3$, $SbI_3$, $SbF_5$, and $SbCl_5$; tellurium halides such as $TeF_4$, $Te_2F_{10}$, $TeF_6$, $TeCl_2$, $TeCl_4$, $TeBr_2$, $TeBr_4$, and $TeI_4$; lead halides such as $PbF_4$, $PbCl_4$, $PbF_2$, $PbCl_2$, $PbBr_2$, and $PbI_2$; and bismuth halides such as $BiF_3$, $BiCl_3$, $BiBr_3$, and $BiI_3$.

Among these, lithium halides such as lithium chloride (LiCl), lithium bromide (LiBr), and lithium iodide (LiI); and phosphorus halides such as phosphorus pentachloride ($PCl_5$), phosphorus trichloride ($PCl_3$), phosphorus pentabromide ($PBr_5$), and phosphorus tribromide ($PBr_3$) are preferred. Among these, lithium halide and $PBr_3$ are preferred, lithium halide is more preferred from the viewpoint of ease of handling, and LiCl and LiBr are further preferred from the viewpoint of further enhancing the ionic conductivity.

As the halogen compound, one of the above-mentioned compounds may be used alone, or in combination of two or more.

In this embodiment, a compound obtained by reacting the above raw materials may be used. For example, $Li_3PS_4$ may be synthesized from $Li_2S$ and $P_2S_5$, and $Li_3PS_4$, $Li_2O$, and LiX may be used as raw materials. Note that $Li_3PS_4$ may be either crystalline or amorphous, and may be a mixture of crystalline and amorphous.

In one embodiment, it is preferable to use one or more of $Li_2O$ and LiOH as raw materials. Further, it is preferable to use $Li_2S$, $Li_2O$, $P_2S_5$, and LiX (wherein X is a halogen) as raw materials. For example, when using $Li_2S$, $Li_2O$, $P_2S_5$, and LiX as raw materials, the molar ratio of the raw materials charged can be $Li_2S:Li_2O:P_2S_5:LiX=1.5$ to 1.9: 0.01 to 0.8:0.5:1.0 to 2.0.

In the mixing step, the above-described raw materials are mixed.

The mixing method is not particularly limited, and a known method can be employed.

In this embodiment, mechanical stress may be applied to the raw materials to mix and react them at the same time, or the raw materials may be mixed and pulverized at the same time. Here, "application of mechanical stress" is to mechanically apply shear stress, impact force, or the like. Means of application of mechanical stress include, for example, a grinder such as a planetary ball mill, a vibrating mill, a tumbling mill, and a beads mill, and a kneader such as a uniaxial kneader and a multiaxial kneader.

The mixing step may be carried out in the presence of a solvent (wet mixing) or may be carried out without using a solvent (dry mixing).

As the conditions in the case of dry mixing, for example, when a planetary ball mill is used as a pulverizer, the rotation speed may be from several tens to several hundreds of revolutions/minute and may be treated for 0.5 hours to 100 hours. More specifically, in the case of the planetary ball mill (Model No. P-7, manufactured by Fritsch Co.) used in the Examples, the rotation speed of the planetary ball mill is preferably 350 rpm or more and 400 rpm or less, more preferably 360 rpm or more and 380 rpm or less.

For example, when a zirconia ball is used as the pulverizing medium, the diameter of the ball is preferably 0.2 to 20 mm.

In one embodiment, since the generation of β-$Li_3PS_4$ may be suppressed, wet mixing is preferred.

As the solvent, an organic solvent can be used, and preferably, a nonpolar solvent, a polar solvent, or a mixed solvent thereof can be used. Preferably, the solvent is a nonpolar solvent, or a solvent containing a nonpolar solvent as the main component, for example, a solvent in which 95% by mass or more of the total organic solvent is a nonpolar solvent.

As the nonpolar solvent, a hydrocarbon-based solvent is preferable. As the hydrocarbon-based solvent, a saturated hydrocarbon, an unsaturated hydrocarbon, or an aromatic hydrocarbon can be used.

Examples of the saturated hydrocarbon include hexane, pentane, 2-ethylhexane, heptane, decane, tridecane, cyclohexane, and the like.

Examples of the unsaturated hydrocarbon include hexene, heptene, cyclohexene, and the like.

Examples of the aromatic hydrocarbon include toluene, xylene, ethylbenzene, decalin, 1,2,3,4-tetrahydronaphthalene, and the like.

Among these, toluene or xylene is preferable.

The hydrocarbon-based solvent is preferably dehydrated in advance. Specifically, the moisture content is preferably 100 ppm by mass or less, and particularly preferably 30 ppm by mass or less.

In one embodiment, it is preferable that the organic solvent contains at least one of a nitrile compound and an ether compound.

Examples of the ether compound include tetrahydrofuran, diethyl ether, and the like.

As the nitrile compound, a nitrile compound represented by $R(CN)_n$ is preferred. In the formula, R is an alkyl group including 1 or more and 10 or less carbon atoms, or a group containing an aromatic ring including 6 or more and 18 or less ring carbon atoms. n is 1 or 2.

Examples include acetonitrile, propionitrile, 3-chloropropionitrile, benzonitrile, 4-fluorobenzonitrile, tertiary-butyronitrile, isobutyronitrile, cyclohexylnitrile, capronitrile, isocapronitrile, malononitrile, and fumaronitrile. Propionitrile, isocapronitrile, and isobutyronitrile are preferable.

For example, the nitrile compound is preferable because it is azeotropic with toluene and can be easily removed together with toluene from the treated product at the time of drying.

The amount of the nitrile compound and the ether compound contained in the organic solvent is preferably 0.01 to 5% by mass, more preferably 0.1 to 3% by mass, and particularly preferably 0.3 to 1% by mass.

It is preferable to use a bead mill in wet mixing. By mixing and pulverizing the raw materials with a bead mill, the particle diameter of each of the raw materials pulverized can be smaller, so that the diffusion path of each element during the heating step shortens, and each element is easily used for generation of an Argyrodite-type crystal structure. As a result, it is considered that generation of different phases such as a $Li_3PS_4$ crystal structure is suppressed.

A mixture of raw materials obtained by removing a solvent from a product treated by wet mixing using a bead mill is mainly composed of fine-particulate crystals. By mixing and pulverizing raw materials, particulation of the raw materials proceeds, and a mixture composed of fine-particulate crystals of the respective raw materials is obtained.

The mixture of raw materials may be calcined. In one embodiment, a raw material mixture is obtained by removing a solvent as described above, and then calcined, so that a powdery calcined product is obtained. The heating temperature and the heating time in the calcination may be appropriately adjusted in consideration of the composition of the calcined product and the like. For example, the heating temperature is preferably 150° C. to 300° C., more preferably 160° C. to 280° C., and particularly preferably 170° C. to 250° C. The heating time is preferably 0.1 to 8 hours, more preferably 0.2 to 6 hours, and particularly preferably 0.25 to 4 hours.

The heating device used during the calcination is not particularly limited. Examples thereof include sharing-type dryers such as an FM-mixer, and a Nauta Mixer; stationary furnaces such as a hearth kiln, and rotating-type furnaces such as a rotary kiln. Note that drying may be performed before calcination, and drying and calcination may be performed simultaneously. The atmosphere during the calcination is not particularly limited, and is preferably an inert gas atmosphere such as nitrogen or argon.

In the case where a mixture of the raw materials is calcined in a solvent, as a solvent used for the calcination, a nonpolar solvent, a polar solvent or a mixture of the above-described solvents can be used. Heating is performed on a slurry in which a mixture of raw materials is dispersed in a solvent. The solvent used for the calcination may be the same or different solvent used for mixing or the like of the raw materials. The use of the same solvent is preferable because a step of removing the solvent is not needed.

The heating temperature and the heating time in the calcination can be appropriately adjusted in consideration of the composition of the raw material and the like. For example, the heating temperature is preferably 150° C. to 300° C., more preferably 160° C. to 280° C., still more preferably 170° C. to 270° C., and particularly preferably 180° C. to 260° C. By setting the above temperature range, a $PS_4$ structure is formed, and the halogen is easily incorporated into an Argyrodite-type crystal structure. Since a mixture of fine-particulate crystals of raw materials is calcined in the solution, crystals containing a $PS_4$ structure can be formed at a relatively low temperature.

The heating time is preferably 10 minutes to 6 hours, more preferably 10 minutes to 3 hours, and particularly preferably 30 minutes to 2 hours.

The heating device used in the calcination is not particularly limited, and it is preferable to use an autoclave when the heating temperature exceeds the boiling point of the solvent used.

The calcined product is collected by removing the solvent used for the calcination from the slurry. The method for removing the solvent is not particularly limited, and distillation of the solvent can be carried out under normal pressure or reduced pressure. Filtration can also be used in combination in order to enhance productivity.

In the heating step, by heating the mixture obtained in the mixing step or the calcined product, a solid electrolyte can be obtained. The heating temperature and time can be appropriately adjusted in consideration of the composition and the like of the mixture and the calcined product. For example, the heating temperature is preferably 300° C. to 470° C., more preferably higher than 300° C. and 460° C. or lower, more preferably 320° C. to 450° C., still more preferably 350° C. to 440° C., and particularly preferably 380° C. to 430° C.

The heating time is preferably 1 to 360 minutes, more preferably 5 to 120 minutes, and particularly preferably 10 to 60 minutes.

The atmosphere during the heating is not particularly limited, and is preferably an atmosphere not under hydrogen sulfide airflow but under an inert gas atmosphere such as nitrogen, argon, or the like. For the heating step, a firing furnace such as a hearth kiln of a stationary-type or a rotary kiln of a rotating-type can be used.

When the calcined product is heated, as a solvent used for heating, a nonpolar solvent, a polar solvent, or a mixture of the above-mentioned solvents can be used. Heating is performed on a slurry in which a calcined product is dispersed in a solvent. The solvent used during the heating may be the same or different solvent used during the calcination or the like. The same solvent is preferably used because a step of performing substitution or removal of the solvent before heating is unnecessary. In addition, as well as in the case of calcination, when the heating temperature exceeds the boiling point of the solvent used, it is preferable to use an autoclave.

The fact that the solid electrolyte obtained by the method of production according to this embodiment contains an Argyrodite-type crystal structure can be confirmed by observation of diffraction peaks at 2θ=25.2±0.5 deg and 29.7±0.5 deg in powder X-ray diffraction measurement using a CuKα line.

Diffraction peaks of 2θ=25.2±0.5 deg and 29.7±0.5 deg are peaks derived from Argyrodite-type crystal structures.

Additional diffraction peaks of the Argyrodite-type crystal structure, may be observed, for example, any at 2θ=15.3±0.5 deg, 17.7±0.5 deg, 31.1±0.5 deg, 44.9±0.5 deg, and 47.7±0.5 deg.

In the present application, the position of the diffraction peak is determined at A±0.5 deg or A±0.4 deg wherein A is the median value of the peak, but the determination is preferably carried out at A±0.3 deg. For example, in the case of the above-mentioned diffraction peak of 2θ=25.2±0.5 deg, the median value A is 25.2 deg, and it is preferable that the diffraction peak is present in the range of 2θ=25.2±0.3 deg. The same can be applied to the determination of all the other diffraction peak positions in the present application.

A solid electrolyte may contain an amorphous component as a part thereof as long as it has X-ray diffraction patterns of the above-mentioned Argyrodite-type crystal structure. The amorphous component indicates a halo pattern, in the X-ray diffraction measurement, in which the X-ray diffraction pattern does not substantially include peaks other than peaks derived from the raw materials. Moreover, the solid electrolyte may contain crystal structures other than the Argyrodite-type crystal structure, and the raw materials.

[Second Aspect]

The solid electrolyte according to this aspect has an Argyrodite-type crystal structure containing lithium (Li), phosphorus (P), sulfur (S), oxygen (O), and halogen (X) as constituent elements, wherein a proportion of a $Li_3PO_4$ crystal structure occupying in the entire crystals in the solid electrolyte is 0.1% by mass or more and 3.0% by mass or less, and lithium (Li), phosphorus (P), sulfur (S), oxygen (O), and halogen (X) satisfies the following formulas (21) to (23).

$$4.8 \leq Li/P \leq 5.3 \tag{21}$$

$$3.8 \leq S/P \leq 4.4 \tag{22}$$

$$1.0 < X/P \leq 2.0 \tag{23}$$

wherein the formula (21) represents a molar ratio of Li to P, the formula (22) represents a molar ratio of S to P, and the formula (23) represents a molar ratio of halogen (X) to P.

The formulas (21) to (23) preferably satisfy the following formulas:

$$4.85 \leq Li/P \leq 5.25$$

$$3.9 \leq S/P \leq 4.3$$

$$1.2 \leq X/P \leq 1.9$$

More preferably, the formulas (21) to (23) satisfy the following formulas.

$$4.9 \leq Li/P \leq 5.2$$

$$4.0 \leq S/P \leq 4.2$$

$$1.4 \leq X/P \leq 1.8$$

The proportion of a $Li_3PO_4$ crystal structure occupying in the entire crystals in the solid electrolyte is 0.1% by mass or more and 3.0% by mass or less. Within this range, it is possible to suppress generation of hydrogen sulfide while maintaining high ionic conductivity.

The proportion of a $Li_3PO_4$ crystal structure is preferably 0.3% by mass or more, and further preferably 0.5% by mass or more. Further, the proportion of a $Li_3PO_4$ crystal structure is preferably 2.0% by mass or less, more preferably 1.5% by mass or less, and still more preferably 1.0% by mass or less.

In one embodiment, the proportion of an Argyrodite-type crystal structure occupying in the entire crystals in the solid electrolyte is 90% by mass or more. By the proportion of an Argyrodite-type crystal structure, high ionic conductivity can be exhibited.

The proportion of an Argyrodite-type crystal structure is preferably 93% by mass or more, more preferably 95% by mass or more, still more preferably 96% by mass or more, and particularly preferably 97% by mass or more.

In one embodiment, the proportion of a $\beta$-$Li_3PS_4$ crystal structure occupying in the entire crystals in the solid electrolyte is 5.0% by mass or less, preferably 4.0% by mass or less, and more preferably 3.0% by mass or less.

The proportions of an Argyrodite type crystal structure, a $Li_3PO_4$ crystal structure, and a $\beta$-$Li_3PS_4$ crystal structure to total crystals in the solid electrolyte are values obtained by synchrotron radiation spectrometry used as in Evaluation Examples.

The composition represented by the formulas (21) to (23) of this aspect can be realized by adjusting the blending amounts of the raw materials. For example, molar ratios of Li and O can be adjusted by decreasing the blending amount of lithium sulfide ($Li_2S$) and increasing the blending amount of lithium oxide ($Li_2O$).

The solid electrolyte according to this embodiment is obtained, for example, by the method of production according to the first aspect described above.

In the solid electrolyte of this embodiment, examples of halogen (X) include F, Cl, Br, I, and the like. Halogen (X) contained in the solid electrolyte may be one kind or two or more kinds, and two kinds are more preferred.

It is preferable that X includes at least one of Cl and Br, and it is further preferable that X includes Cl and Br.

In one embodiment; the solid electrolyte may contain; in addition to Li, P, S, O, and halogen (X) described above; one or more elements selected from the group consisting of H, Si; Ge, Sn, Pb, B, Al, Ga, As, Sb, and Bi; in an amount to such an extent that the effect of the invention is not impaired.

In one embodiment; the solid electrolyte has a composition represented by the following formula (A):

$$Li_aP_bS_cO_dX_e \qquad (A)$$

In the formula, X is halogen, and a to e indicate the composition ratios of respective elements, and satisfy $4.8 \leq a \leq 5.3$, $b=1$, $3.8 \leq c \leq 4.4$, $0 < d \leq 0.8$, and $1 < e \leq 2.0$; respectively.

X in the formula (A) may be composed of one kind or two or more kinds ($x_1, \ldots, x_n$: n is an integer of 2 or more and 4 or less) selected from the group consisting of F, Cl, Br and I. X is more preferably composed of two kinds ($x_1, x_2$). The molar ratios of respective elements are not particularly limited.

X in the formula (A) is preferably composed of Cl and Br.

In this specification, the molar ratios and the composition of respective elements in a solid electrolyte can be measured by various methods known to those skilled in the art, and can be measured by an ICP emission spectrometry method except for special circumstances such that the analysis is difficult. For example, in the case of the solid electrolyte described in this specification, the molar ratios and the composition of elements other than oxygen can be measured by ICP emission spectrometry.

The molar ratios of respective elements can be adjusted by varying the contents of the respective elements in raw materials.

In the solid electrolyte according to one embodiment, the lattice constant of an Argyrodite-type crystal structure is preferably 9.820 Å or smaller, more preferably 9.815 Å or smaller, still more preferably 9.811 Å or smaller, and particularly preferably 9.810 Å or smaller, from the viewpoint of further suppressing the generation of hydrogen sulfide. When the lattice constant is within the above range, it is considered that sulfur elements in the 4a and 4d sites in the Argyrodite-type crystal structure are sufficiently reduced, and the sulfur elements in the 4a and 4d sites are substituted with halogen elements having a smaller ionic radius.

Note that the lattice constant can be measured by synchrotron radiation spectrometry described in Examples.

In the solid electrolyte according to one embodiment, from the viewpoint of further enhancing the ionic conductivity, it is preferable that a ratio of the peak intensity of the diffraction peak derived from a $Li_3PS_4$ crystal structure to the diffraction peak of $2\theta=25.2\pm0.5$ deg derived from an Argyrodite-type crystal structure is less than 0.04.

This is because $Li_3PS_4$ has a lower ionic conductivity in comparison with that of an Argyrodite-type crystal structure, so that the lower the content ratio of a $Li_3PS_4$ crystal structure in the solid electrolyte, the lowering of the ionic conductivity can be suppressed.

As described above, when the amount of $Li_2S$ in the raw materials of the solid electrolyte is decreased in order to suppress generation of hydrogen sulfide, the sulfur element required for forming an Argyrodite-type crystal structure is deficient, and other crystal phases such as $Li_3PS_4$ are easily generated. However, the inventors have succeeded in decreasing the sulfur element content in an Argyrodite-type crystal structure itself by suppressing the amount of $Li_3PS_4$ to be generated by mixing the raw materials at a specific ratio, and achieving both suppression of hydrogen sulfide generation and high ionic conductivity at the same time at a higher level.

In this regard, in the invention described in Patent Document 1, the peak intensity ratio derived from $Li_3PS_4$ is increased due to decrease of $Li_2S$. This is considered not a reduction decrease of sulfur elements from the argyrodite crystal structure itself, as in one embodiment of the invention, and the reduced amount of sulfur elements forms other crystal structures such as $Li_3PS_4$ instead of the Argyrodite-type crystal structure.

Further, an Argyrodite-type crystal structure is retained and a high ionic conductivity is attained, by the presence of oxygen atom during the heating step while reducing the generation amount of hydrogen sulfide by decreasing the content of sulfur element. In Patent Document 2, $Li_2O$ is simply added after forming an Argyrodite-type crystal structure by heating, and no oxygen element is present during the heating step for forming an Argyrodite-type crystal structure as in the first embodiment of the invention. Therefore, as in the first embodiment, it is difficult to exhibit high ionic conductivity while reducing the generation amount of hydrogen sulfide.

The solid electrolyte of the invention can be used in a lithium-ion battery or the like. Specifically, the solid electrolyte of the invention can be used for a solid electrolyte layer, a positive electrode, a negative electrode, or the like of a battery.

In one embodiment, an electrode for a lithium-ion battery may contain a known active material, a conductive auxiliary agent, or the like, in addition to the solid electrolyte. Further, a binder may be blended.

A lithium-ion battery according to one embodiment contains the solid electrolyte of the invention.

In one embodiment, the lithium-ion battery is an all-solid-state battery.

In one embodiment, an all-solid-state battery contains a stacked body including a positive electrode current collector, a positive electrode, an electrolyte layer, a negative electrode, and a negative electrode current collector in this order. In the lithium-ion battery, it is preferable that one or more selected from the group consisting of a positive electrode, an electrolyte layer, and a negative electrode contain the solid electrolyte of the invention.

EXAMPLE

The invention will be described below in more detail with Examples.

The evaluation methods are as follows.

(1) Generation Amount of Hydrogen Sulfide ($H_2S$) from a Solid Electrolyte

Figure 1:
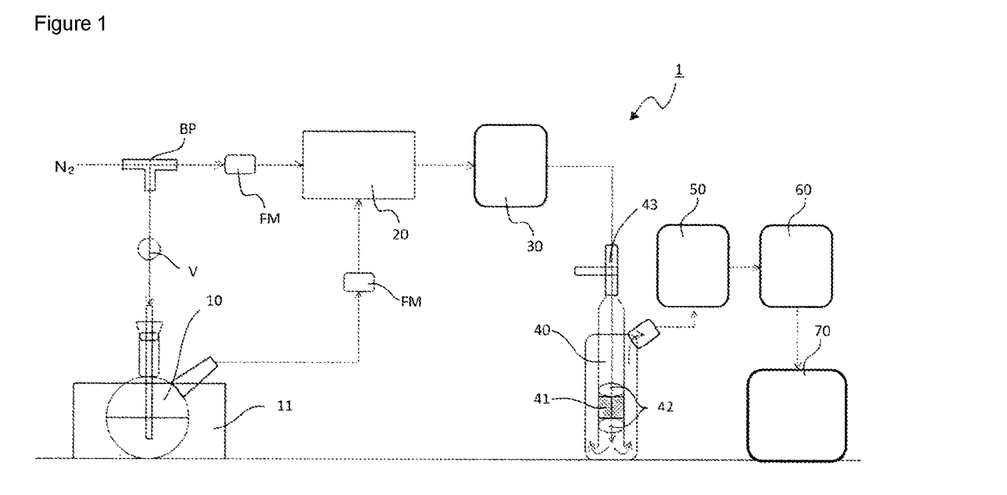
FIG. 1 is a schematic configuration diagram of a test apparatus for measuring the generation amount of hydrogen sulfide.

FIG. 1 shows a schematic configuration diagram of a test apparatus.

The test apparatus 1 includes, as main components, a flask 10 for humidifying nitrogen, a static mixer 20 for mixing humidified nitrogen and nitrogen not humidified, a dew-point meter 30 for measuring moisture of the mixed nitrogen (M170/DMT152 manufactured by Vaisala Oyj), a double reaction tube 40 for installing a measurement sample, a dew-point meter 50 for measuring moisture of nitrogen discharged from the double reaction tube 40, and a hydrogen sulfide measuring instrument 60 for measuring hydrogen sulfide concentration contained in the discharged nitrogen (Model 3000RS manufactured by Advanced Micro Instruments, Inc.), and has a configuration in which these components are connected by tubes (not shown). The temperature of the flask 10 is set to 10° C. by a cooling tank 11.

Here, a Teflon (registered trademark) tube having a diameter of 6 mm was used as the tubes connecting the respective components. In this figure, the tubes are omitted, and the flow of nitrogen is indicated by arrows instead.

The evaluation procedure was as follows.

In a glove box filled with nitrogen having a dew-point of −80° C., about 1 g of a powder sample 41 was weighed, placed inside the reaction tube 40 to be sandwiched between quartz wools 42 so as to be sealed. Note that the temperature inside the reaction tube 40 was kept at about room temperature (25° C.).

Nitrogen was supplied into the apparatus 1 from a nitrogen source (not shown) at a pressure of 0.02 MPa. The supplied nitrogen passes through the biforked branch pipe BP, and a part of the nitrogen is supplied to the flask 10 to be humidified. The residual nitrogen is supplied directly to the static mixer 20 as the non-humidified nitrogen. Note that the amount of nitrogen supplied to the flask 10 is adjusted by means of a needle valve V.

The dew-point is controlled by adjusting the flow rates of the non-humidified nitrogen and the humidified nitrogen by means of flow meters FM with a needle valve. Specifically, the non-humidified nitrogen and the humidified nitrogen were supplied to the static mixer 20 at a flow rate of 800 mL/min and at a flow rate of 10 to 30 mL/min, respectively to mix them. The dew-point of the mixed gas (a mixture of the non-humidified nitrogen and the humidified nitrogen) is measured by means of the dew-point meter 30.

After the dew-point was adjusted to −30° C., the three-way cock 43 was rotated to allow the mixed gas to flow through the reaction tube 40 for 2 hours. The amount of hydrogen sulfide contained in the mixed gas that has passed through the sample 41 was measured by the hydrogen sulfide measuring instrument 60, and the generation amount of hydrogen sulfide per 1 g of the solid electrolyte (cc/g) was calculated. The amount of hydrogen sulfide was recorded at intervals of 15 seconds. Further, for reference, the dew-point of the mixed gas after exposure to the sample was measured by means of the dew-point meter 50. The nitrogen after the above-mentioned measurements was passed through an alkaline trap 70 to remove hydrogen sulfide.

(2) Measurement for Ionic Conductivity of Solid Electrolyte

A sample was filled in a tablet molding machine, followed by application of pressure of 22 MPa to form a molded body. Carbons were placed on both sides of the molded body as electrodes, and pressure was applied again thereto by the tablet molding machine, to produce a molded body for measurement (diameter: about 10 mm, thickness: 0.1 to 0.2 cm). The ionic conductivity of this molded body was measured by AC impedance measurement. The conductivity value at 25° C. was adopted.

(3) X-Ray Diffraction (XRD) Measurement

The powder of the Argyrodite-type solid electrolyte produced in each Example was uniformly filled into a groove having a diameter of 20 mm and a depth of 0.2 mm by the use of a glass to prepare a sample. This sample was subjected to measurement without exposure to the air by the use of a Kapton Film for XRD. 2θ position of a diffraction peak was determined by Le Bail analysis using an XRD analytic program RIETAN-FP.

The measurement was conducted using a powder X-ray diffraction measurement device D2 PHASER manufactured by BRUKER corporation under the following conditions.

Note that the powder X-ray diffraction measurement device was installed in a room where temperature was managed to 25° C.

Tube voltage: 30 kV
Tube current: 10 mA
X-ray wavelength: Cu-Kα ray (1.5418 Å)
Optical system: concentration technique
Slit configuration: solar slit 4°, divergent slit 1 mm, Kβ filter (Ni plate) is used
Detector: semiconductor detector
Measurement range: 2θ=10 to 60 deg
Step width, scan speed: 0.05 deg, 0.05 deg/sec In the analysis of a peak position to ascertain the presence of a crystal structure from a measurement result, the XRD analytic program RIETAN-FP was used, a baseline was compensated in accordance with undecic Legendre orthogonal polynomials, and a peak position was determined.

(4) ICP Measurement

A sample of the solid electrolyte powder produced in each Example was weighed and placed in a vial in an argon atmosphere. To this vial, a KOH alkaline aqueous solution was added, followed by dissolution of the sample while taking care of the collection of the sulfur content, and the solution was appropriately diluted to obtain a measurement solution. This solution was subjected to measurement with a Paschen Runge type ICP-OES apparatus (SPECTRO ARCOS manufactured by SPECTRO), to determine the composition.

Calibration solutions for Li, P, and S were respectively prepared by using a 1000 mg/L standard solution for ICP measurement, and calibration solutions for Cl and Br were respectively prepared by using a 1000 mg/L standard solution for ion chromatography.

Two measurement solutions were prepared for each sample, and five measurements were performed for each measurement solution to calculate an average value. The composition was determined by taking the average value of the two measurement solutions.

Production Example 1

[Production of Lithium Sulfide ($Li_2S$)]

$Li_2S$ was produced and purified as described below.

In a 500 L stainless-steel reaction vessel, 303.8 kg of toluene (manufactured by Sumitomo Corporation) as a non-aqueous medium, which was dehydrated and had a moisture content of 100 ppm when measured by a Karl Fischer moisture meter was placed under nitrogen airflow. Then, 33.8 kg of anhydrous lithium hydroxide (manufactured by Honjo Chemical Corporation) was added thereto, and the slurry was kept at 95° C. while being stirred with a twin star stirring blade at 131 rpm.

The slurry was heated up to 104° C. while hydrogen sulfide (manufactured by Sumitomo Seika Chemicals Company, Limited) was blown into the slurry at a feed rate of 100 L/min. An azeotropic gas of water and toluene was continuously discharged from the reaction kiln. This azeotropic gas was condensed by using an out-of-system condenser to achieve dehydration. In the meantime, the same amount of toluene as distilling toluene was continuously supplied to the reaction kiln, so that the reaction liquid level was maintained constant.

The moisture content in the condensate gradually decreased, and no distillation of water was observed after 24 hours from starting the introduction of hydrogen sulfide. During the reaction, the reaction liquid was in the state that the solid was dispersed in toluene with stirring, and there was no moisture separated from toluene.

Subsequently, hydrogen sulfide was switched to nitrogen, and the nitrogen was flowed at 100 L/min for 1 hour.

The obtained solid was collected by filtration and dried to obtain $Li_2S$ as a white powder.

Example 1

$Li_2S$ obtained by Production Example 1, $P_2S_5$, LiBr (manufactured by The Honjo Chemical Corporation), LiCl (manufactured by The Honjo Chemical Corporation), and $Li_2O$ (manufactured by FUJIFILM Wako Pure Chemical Corporation) were used as the starting materials. The raw materials were mixed such that the molar ratio of the starting materials ($Li_2S:P_2S_5:LiCl:LiBr:Li_2O$) coarsely crushed by the pin mill was 1.65:0.5:1.0:0.6:0.05. Specifically, 0.402 g of $Li_2S$, 0.589 g of $P_2S_5$, 0.225 g of LiCl, 0.276 g of LiBr, and 0.008 g of $Li_2O$ were mixed.

The mixture and 30 g of zirconia balls having a diameter of 10 mm were placed in a zirconia pot (45 mL) of a planetary ball mill (manufactured by Fritsch Co., Ltd., model No. P-7) and completely sealed. The inside of the pot was made to be a nitrogen atmosphere. The mixture was treated (pre-mixing) in the planetary ball mill at a rotation speed of 150 rpm for 10 minutes. Then, the mixture was treated (mechanical milling) at a rotation speed of 370 rpm for 15 hours to obtain a powder of the raw material mixture.

About 1.5 g of the raw material mixture was packed into a Tamman tube (PT2, manufactured by Tokyo Glass Equipment Co., Ltd.) in a glove box under an Ar atmosphere, and the Tamman tube was placed in an electric furnace, and heated. Specifically, the temperature was raised from room temperature to 380° C. in 1 hour, then raised to 430° C. in 30 minutes, and held at 430° C. for 2 hours. Thereafter, the Tamman tube was taken out from the electric furnace and allowed to cool to obtain a solid electrolyte.

The molar ratio of the raw material; the molar ratio of each element, the generation amount of hydrogen sulfide, and the ionic conductivity of the obtained solid electrolyte are shown in Table 1.

Figure 2:
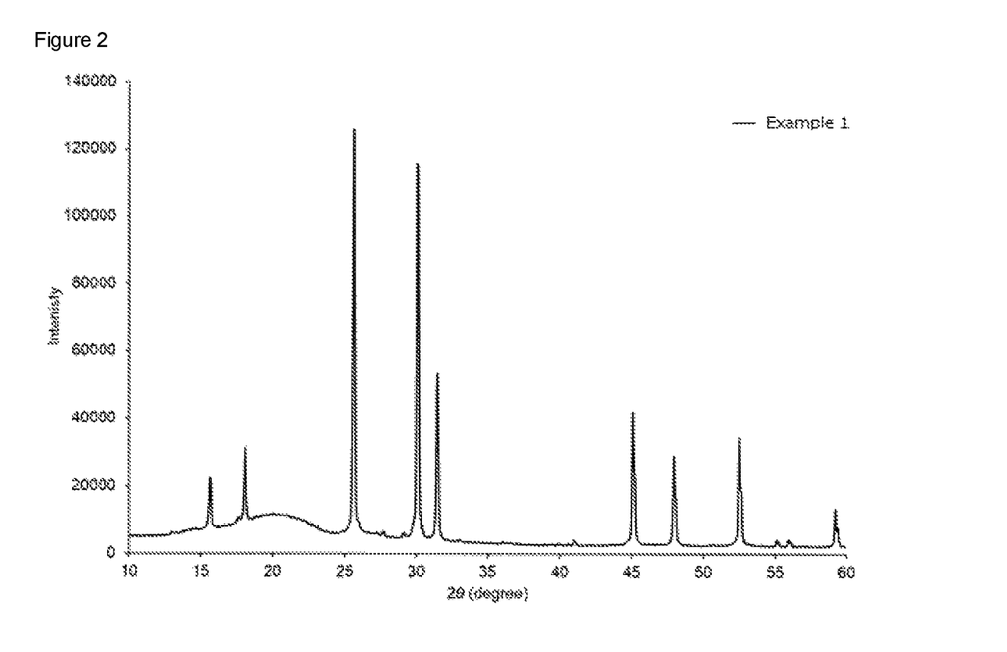
FIG. 2 is an X-ray diffraction (XRD) pattern of a solid electrolyte obtained in Example 1.

The XRD pattern of the solid electrolyte is shown in FIG. 2. Diffraction peaks of the Argyrodite-type crystal structure were observed at 2θ=15.6 deg, 18.1 deg, 25.6 deg, 30.1 deg, 31.5 deg, and 45.1 deg.

Examples 2 to 4, and Comparative Examples 1 to 5

Solid electrolytes were prepared and evaluated in the same manner as in Example 1, except that the molar ratio of the starting materials was changed as shown in Table 1. The results are shown in Table 1. The XRD patterns of the solid electrolytes obtained in Examples 2 to 4 and Comparative Examples 1 to 5 are shown in FIGS. 3 to 10, respectively.

Figure 3:
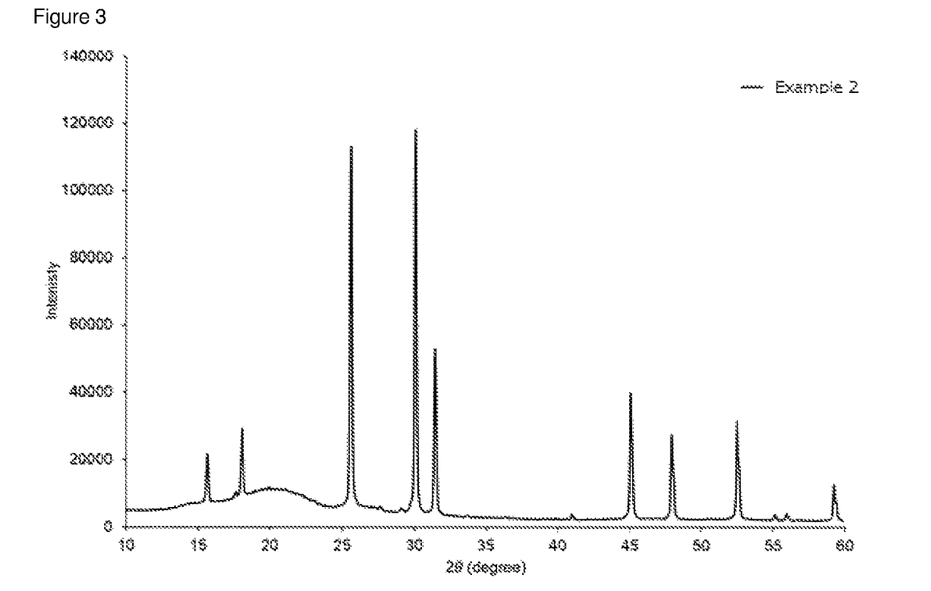
FIG. 3 is an XRD pattern of a solid electrolyte obtained in Example 2.

In Example 2, diffraction peaks of the Argyrodite-type crystal structure were observed at 2θ=15.6 deg, 18.1 deg, 25.6 deg, 30.1 deg, 31.5 deg, and 45.1 deg. In the solid electrolyte of Example 2, diffractive peaks derived from $Li_3PO_4$ were also observed.

Figure 4:
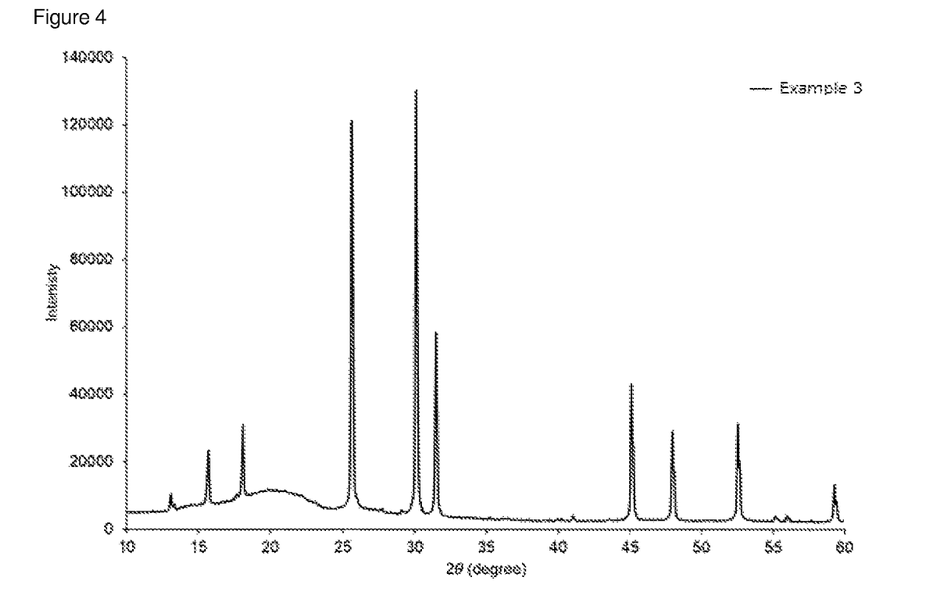
FIG. 4 is an XRD pattern of a solid electrolyte obtained in Example 3.

In Example 3, diffraction peaks of the Argyrodite-type crystal structure were observed at 2θ=15.7 deg, 18.1 deg, 25.6 deg, 30.1 deg, 31.5 deg, and 45.1 deg.

Figure 5:
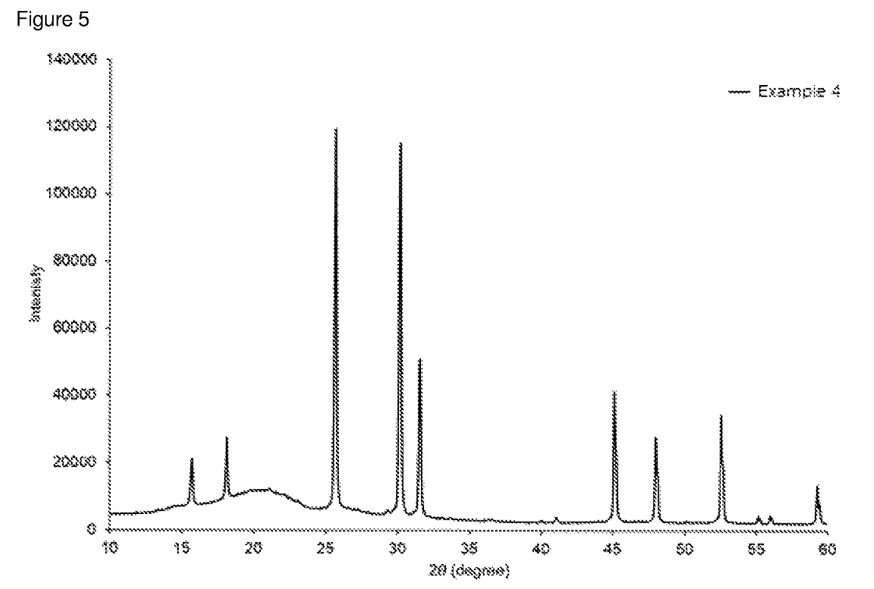
FIG. 5 is an XRD pattern of a solid electrolyte obtained in Example 4.
Figure 6:
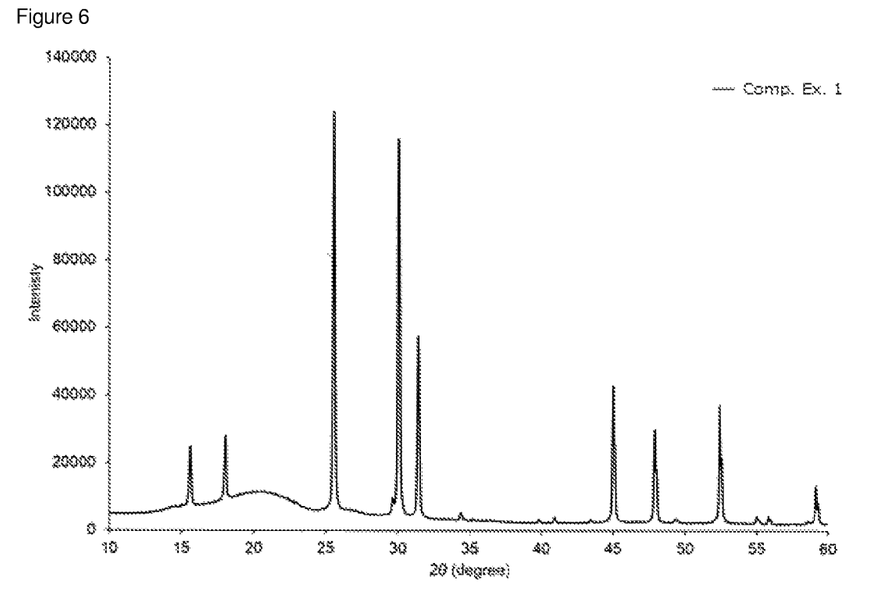
FIG. 6 is an XRD pattern of a solid electrolyte obtained in Comparative Example 1.
Figure 7:
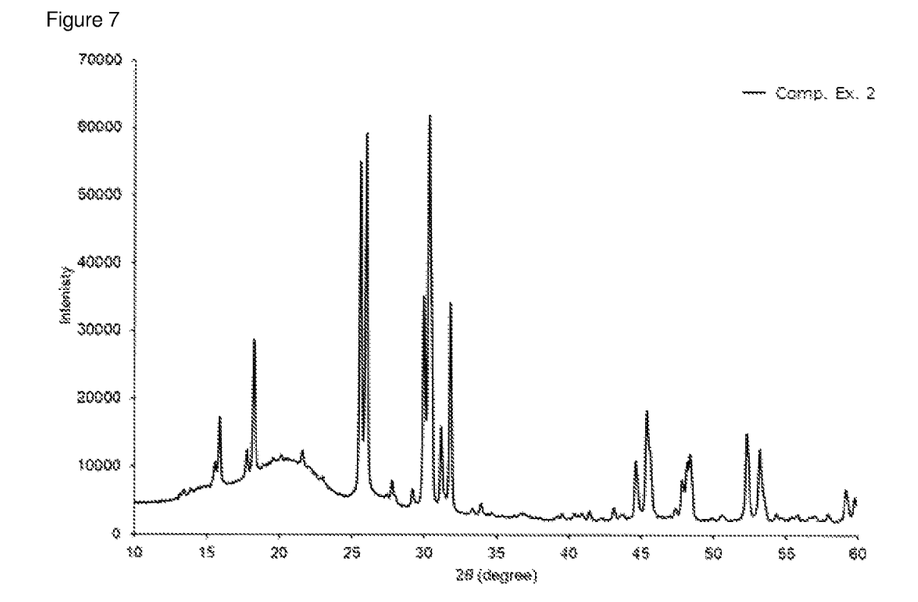
FIG. 7 is an XRD pattern of a solid electrolyte obtained in Comparative Example 2.
Figure 8:
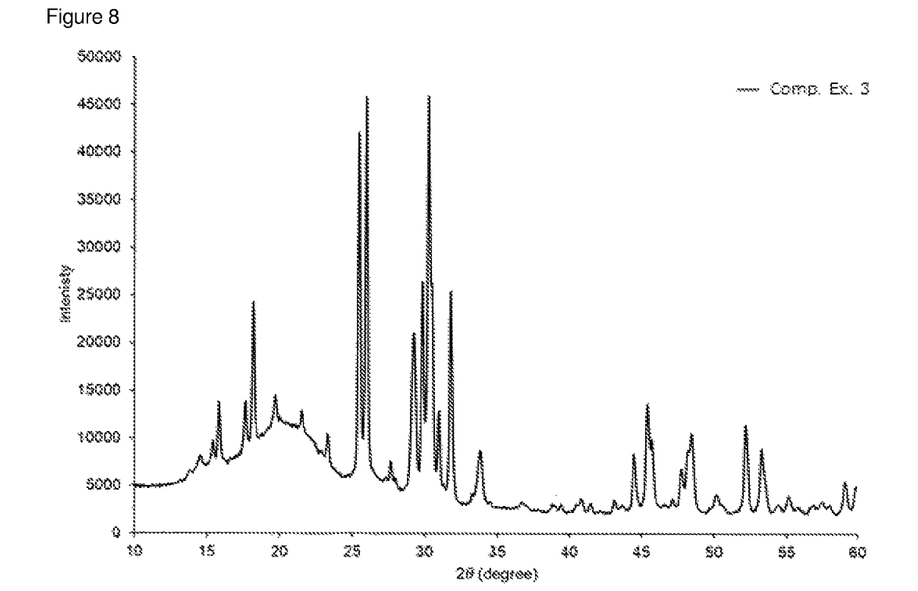
FIG. 8 is an XRD pattern of a solid electrolyte obtained in Comparative Example 3.
Figure 9:
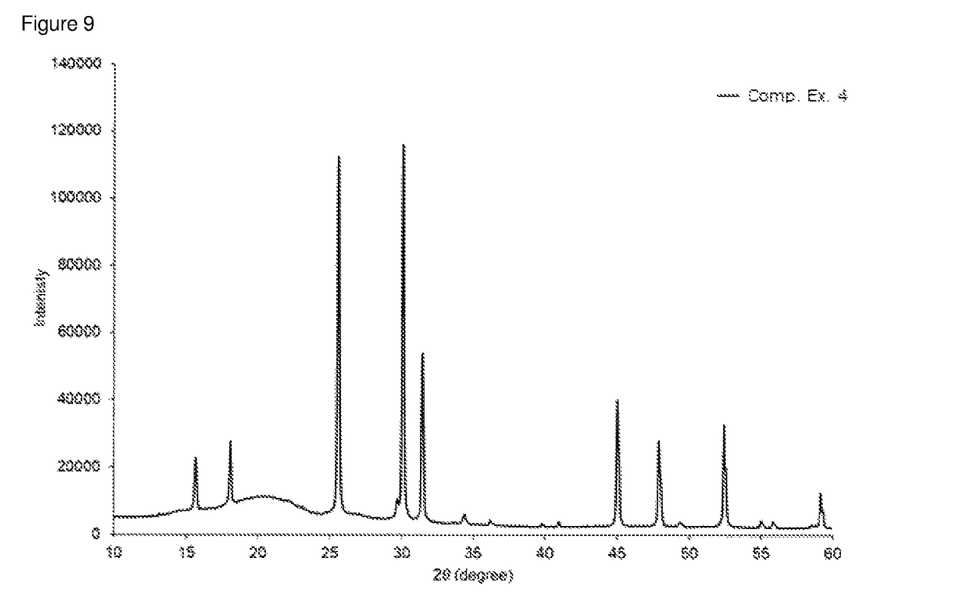
FIG. 9 is an XRD pattern of a solid electrolyte obtained in Comparative Example 4.
Figure 10:
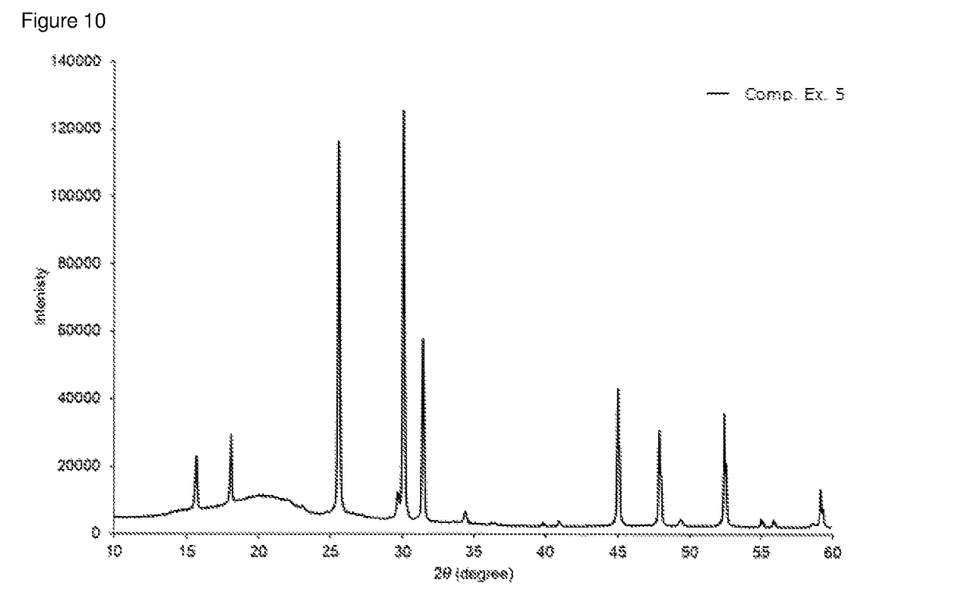
FIG. 10 is an XRD pattern of a solid electrolyte obtained in Comparative Example 5.

In Example 4, diffraction peaks of the Argyrodite-type crystal structure were observed at 2θ=15.7 deg, 18.1 deg, 25.7 deg, 30.2 deg, 31.6 deg, and 45.1 deg.

For Examples 2 and 4, and Comparative Examples 1, 2 and 5, the results of the composition of the solid electrolyte determined by ICP measurement are shown in Table 2.

TABLE 1

| Molar ratio | Example 1 | Example 2 | Example 3 | Example 4 | Comp. Ex. 1 | Comp. Ex. 2 | Comp. Ex. 3 | Comp. Ex. 4 | Comp. Ex. 5 |
|---|---|---|---|---|---|---|---|---|---|
| $Li_2S$ | 1.65 | 1.6 | 1.55 | 1.5 | 1.9 | 1.6 | 1.5 | 1.7 | 1.6 |
| $P_2S_5$ | 0.5 | 0.5 | 0.5 | 0.5 | 0.5 | 0.5 | 0.5 | 0.5 | 0.5 |
| LiCl | 1.0 | 1.0 | 1.0 | 1.0 | 1.0 | 1.0 | 1.0 | 1.0 | 1.0 |
| LiBr | 0.6 | 0.6 | 0.6 | 0.6 | 0.6 | 0.6 | 0.6 | 0.6 | 0.6 |
| $Li_2O$ | 0.05 | 0.1 | 0.15 | 0.2 | — | — | — | 0.2 | 0.3 |
| Li | 5.0 | 5.0 | 5.0 | 5.0 | 5.4 | 4.8 | 4.6 | 5.4 | 5.4 |
| P | 1.0 | 1.0 | 1.0 | 1.0 | 1.0 | 1.0 | 1.0 | 1.0 | 1.0 |
| S | 4.15 | 4.1 | 4.05 | 4.0 | 4.4 | 4.1 | 4.0 | 4.2 | 4.1 |
| Cl | 1.0 | 1.0 | 1.0 | 1.0 | 1.0 | 1.0 | 1.0 | 1.0 | 1.0 |
| Br | 0.6 | 0.6 | 0.6 | 0.6 | 0.6 | 0.6 | 0.6 | 0.6 | 0.6 |

TABLE 1-continued

| Molar ratio | Example 1 | Example 2 | Example 3 | Example 4 | Comp. Ex. 1 | Comp. Ex. 2 | Comp. Ex. 3 | Comp. Ex. 4 | Comp. Ex. 5 |
|---|---|---|---|---|---|---|---|---|---|
| O | 0.05 | 0.1 | 0.15 | 0.2 | — | — | — | 0.2 | 0.3 |
| Generation amount of H$_2$S [cc/g] | <0.6 | <0.6 | <0.6 | 0.8 | 2.9 | <0.6 | — | 2.7 | 3.7 |
| Ionic conductivity [mS/cm] | 9.6 | 9.9 | 7.7 | 8.2 | 11.3 | 0.4 | <0.1 | 9.3 | 8.8 |

TABLE 2

| ICP:molar ratio | Example 2 | Example 4 | Comp. Ex. 1 | Comp. Ex. 2 | Comp. Ex. 5 |
|---|---|---|---|---|---|
| Li | 5.00 | 5.06 | 5.51 | 4.89 | 5.59 |
| P | 1.00 | 1.00 | 1.00 | 1.00 | 1.00 |
| S | 4.00 | 4.01 | 4.44 | 4.17 | 4.17 |
| Cl | 1.04 | 1.08 | 1.06 | 1.05 | 1.09 |
| Br | 0.64 | 0.63 | 0.64 | 0.63 | 0.64 |

Example 5

The same Li$_2$S, P$_2$S$_5$, LiCl, and LiBr as in Example 1, and LiOH (that was lithium hydroxide obtained by drying lithium hydroxide monohydrate manufactured by The Honjo Chemical Corporation) were used as the starting materials. The raw materials were mixed such that the molar ratio (Li$_2$S:P$_2$S$_5$:LiCl:LiBr:LiOH) of the starting materials coarsely crushed by the pin mill was 1.6:0.5:1.0:0.6:0.2. Specifically, 0.3884 g of Li$_2$S, 0.5871 g of P$_2$S$_5$, 0.224 g of LiCl, 0.2753 g of LiBr, and 0.0253 g of LiOH were mixed.

Hereinafter, as in Example 1, these raw materials were treated with the planetary ball mill to obtain a mixture of the raw materials, and the mixture was subjected to heat treatment to obtain a solid electrolyte. Evaluation results are shown in Table 3.

Figure 11:
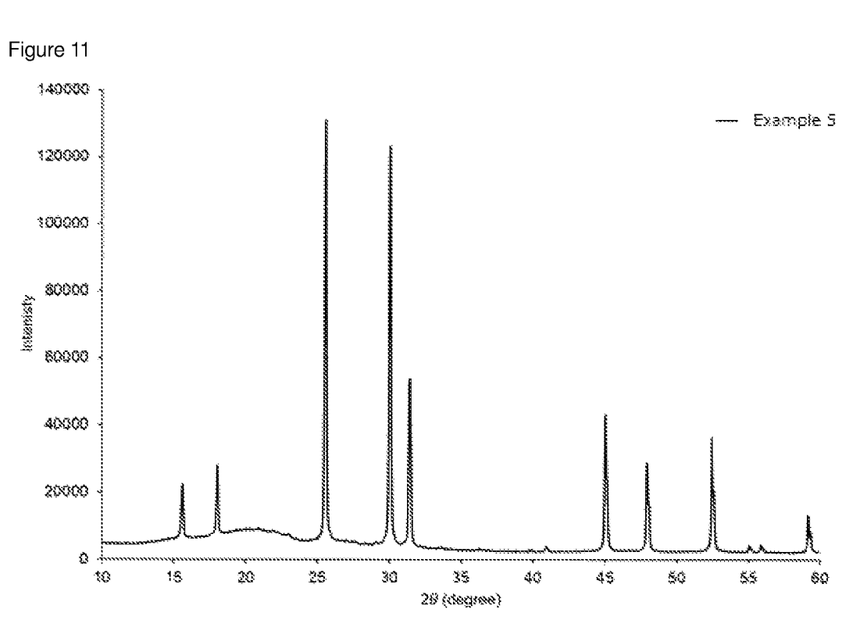
FIG. 11 is an XRD pattern of a solid electrolyte obtained in Example 5.

The XRD pattern of the solid electrolyte is shown in FIG. 11. Diffraction peaks of the Argyrodite-type crystal structure were observed at 2θ=15.6 deg, 18.0 deg, 25.6 deg, 30.1 deg, 31.5 deg, and 45.0 deg.

TABLE 3

| Molar ratio | Example 5 |
|---|---|
| Li$_2$S | 1.6 |
| P$_2$S$_5$ | 0.5 |
| LiCl | 1.0 |
| LiBr | 0.6 |
| LiOH | 0.2 |
| Li | 5.0 |
| P | 1.0 |
| S | 4.1 |
| Cl | 1.0 |
| Br | 0.6 |
| O | 0.2 |
| H | 0.2 |
| Generation amount of H$_2$S [cc/g] | 0.6 |
| Ionic conductivity [mS/cm] | 8.7 |

In Table 1, the molar ratio of S in the solid electrolyte is changed depending on the charge amount of Li$_2$S in Comparative Examples 1 to 3. The solid electrolyte of Comparative Example 1 has high ionic conductivity even among solid electrolytes having an Argyrodite-type crystal structure. Although the solid electrolyte of Comparative Example 1 has an excellent ionic conductivity, it can be seen that the generation amount of hydrogen sulfide is large. In Examples 1 to 4 and Comparative Examples 4 and 5, Li$_2$O is added while decreasing the amount of Li$_2$S to be charged. As a result, the solid electrolyte of Example 2 has a sufficiently high ionic conductivity as well as a greatly suppressed generation amount of hydrogen sulfide, even though the S amount of the solid electrolyte (molar ratio of S is 4.1) was the same as the solid electrolyte of Comparative Example 2. The same tendency can be confirmed from the comparison of Example 4 and Comparative Example 3.

On the other hand, in the solid electrolytes of Comparative Examples 4 and 5 in which Li$_2$O was added, the generation amount of hydrogen sulfide increased. Therefore, it can be confirmed that it is effective to add a predetermined amount of Li$_2$O when the content ratio of S in the solid electrolyte is decreased by reducing the amount of Li$_2$S used.

In addition, in the solid electrolyte of Example 5 in which LiOH was added instead of adding Li$_2$O, the same effects as in Example 2 were obtained, and it can be confirmed that any of the raw materials can be used.

Evaluation Example

The solid electrolytes of Examples 2 and 4, and Comparative Examples 1, 4 and 5, were subjected to synchrotron radiation spectrometry to analyze the lattice constant of an Argyrodite-type crystal structure, and the respective proportions of the Argyrodite-type crystal structure, a Li$_3$PO$_4$ crystal structure, and a β-Li$_3$PS$_4$ crystal structure occupying in the entire crystals in the solid electrolyte. Specifically, measurements were performed under the following conditions.

The each powder of the solid electrolyte produced in Examples 2 and 4, and Comparative Examples 1, 4 and 5 was loaded into a 0.3 mmΦ capillary in a glove box, and the capillary tip was sealed with a thermosetting resin to obtain a sample for synchrotron radiation spectrometry.

The measurement was performed by using the beamline "BL19B2" for measurement of powder diffractometry of SPring-8 under the following conditions. For the measurement, nitrogen gas at 100 K was blown onto a sample for 1 minute using a nitrogen gas blowing type sample cooling device manufactured by Rigak Corporation, and the measurement was carried out on the sample which was kept in the state.

X-ray energy: 25 keV
Optical system: permeation technique
Detector: 1-D solid-state silicon detector MYTHEN (12 stations)
Threshold of detector: 19 keV Measuring range: 2θ=4 to 60 deg
Step width: 0.005 deg
Exposure time: 30 seconds, twice The measured data were corrected at 0.005° intervals using scripts dedicated to BL19B2, and the corrected data were used for analysis.

The peak position for confirming the presence of a crystal structure was determined by PDXL automated profile processing by using an XRD analysis program PDXL2 (Version 2.7.3.0 manufactured by Rigaku Corporation). In the analysis for determining the lattice constant and the presence proportion of a crystal structure, the XRD analysis program PDXL2 (Version 2 7.3.0) manufactured by Rigaku Corporation was used, and the lattice constant and the presence proportion of the crystal structure were determined in accordance with Rietveld analysis using the following functions.

Peak shape: split-type pseudo-Voigt function
Background: β-spline function
Peak shift: instrument function ($\Delta 2\theta = Z + D \cos\theta + T \sin 2\theta$)

In the analysis of the lattice constant, the value of the X-ray energy was corrected before the analysis. Specifically, $CeO_2$ was measured at a changed temperature of 300 K and the changed exposure time of 20 seconds among the above measurement conditions, the measurement result was subjected to a Rietveld analysis under the above-mentioned analysis conditions, and the value of the X-ray energy was compensated such that the lattice constant became 5.41165 Å.

For analysis of a peak shape of a crystal other than the Argyrodite-type crystal structure, the same function as the profile function used for an Argyrodite-type crystal structure was also applied.

In a Rietveld analysis, an Rwp value becoming 10% or less was an indication of the validity of the results.

The results are shown in Table 4.

TABLE 4

| | Lattice constant (Å) | Proportion of crystal structure (% by mass) | | | |
|---|---|---|---|---|---|
| | | Argyrodite | β-$Li_3PS_4$ | $Li_3PO_4$ | LiCl, LiBr |
| Example 2 | 9.808 | 97.6 | 1.7 | 0.7 | 0 |
| Example 4 | 9.811 | 96.1 | 1.6 | 1.4 | 0.9 |
| Comp. Ex. 1 | 9.825 | 100 | 0 | 0 | 0 |
| Comp. Ex. 4 | 9.827 | 99.2 | 0 | 0.8 | 0 |
| Comp. Ex. 5 | 9.830 | 98.1 | 0 | 1.9 | 0 |

From Table 4, it can be confirmed that the lattice constants of Examples 2 and 4 are smaller as compared with Comparative Examples. From this fact, it is considered that, in the interior of the Argyrodite-type crystal structure of Examples, sulfur ions ($S^{2-}$) having a large ionic radius are removed from the 4a or 4d site, and instead, halogen ions having a small ionic radius occupy one or more of the 4a or 4d sites, so that the lattice constant is becomes small.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method for producing a solid electrolyte having an Argyrodite-type crystal structure, comprising:
   mixing raw materials to obtain a mixture; and
   heating the mixture;
   wherein lithium (Li), phosphorus (P), sulfur (S), oxygen (O), and halogen (X) are present in the raw materials in molar ratios satisfying formulas (11) to (14):

$$4.8 \leq Li/P \leq 5.3 \tag{11}$$

$$3.8 \leq S/P \leq 4.4 \tag{12}$$

$$0 < O/P \leq 0.8 \tag{13}$$

$$1.0 < X/P \leq 2.0 \tag{14}.$$

2. The method according to claim 1, wherein the raw materials comprise one or more selected from the group consisting of $Li_2O$ and LiOH.

3. The method according to claim 1, wherein the raw materials comprise $Li_2S$.

4. The method according to claim 1, wherein the raw materials comprise $P_2S_5$.

5. The method according to claim 1, wherein the raw materials comprise one or more selected from the group consisting of LiX (wherein X is halogen) and a halogen simple substance.

6. The method according to claim 1, wherein the raw materials comprise $Li_3PS_4$, $Li_2O$, and LiX (wherein X is halogen).

7. The method according to claim 1, wherein the halogen (X) comprises chlorine (Cl) and bromine (Br).

8. The method according to claim 1, wherein mixing raw materials comprises mixing in a solvent.

9. The method according to claim 1, wherein mixing raw materials comprises mixing with a bead mill.

10. A solid electrolyte, comprising lithium (Li), phosphorus (P), sulfur (S), oxygen (O), and halogen (X), wherein:
    the solid electrolyte has an Argyrodite-type crystal structure;
    a proportion of a $Li_3PO_4$ crystal structure relative to all crystal structures of the solid electrolyte is 0.1% by mass or more and 3.0% by mass or less; and
    lithium (Li), phosphorus (P), sulfur (S), oxygen (O), and halogen (X) are present in the solid electrolyte in molar ratios satisfying formulas (21) to (23):

$$4.8 \leq Li/P \leq 5.3 \tag{21}$$

$$3.8 \leq S/P \leq 4.4 \tag{22}$$

$$1.0 < X/P \leq 2.0 \tag{23}.$$

11. The solid electrolyte according to claim 10, wherein a proportion of the Argyrodite-type crystal structure relative to all crystal structures of the solid electrolyte is 90% by mass or more.

12. The solid electrolyte according to claim 10, wherein a proportion of a β-$Li_3PS_4$ crystal structure relative to all crystal structures of the solid electrolyte is 5.0% by mass or less.

13. The solid electrolyte according to claim 10, having diffraction peaks at 2θ=25.2±0.5 deg and 29.7±0.5 deg in a powder X-ray diffraction measurement using a CuKα line.

14. The solid electrolyte according to claim 10, wherein the halogen (X) is one or more selected from the group consisting of fluorine (F), chlorine (Cl), bromine (Br), and iodine (I).

15. The solid electrolyte according to claim 10, wherein the halogen (X) is one or more selected from the group consisting of chlorine (Cl) and bromine (Br).

16. The solid electrolyte according to claim 10, wherein a lattice constant of the Argyrodite-type crystal structure is 9.820 Å or smaller.

* * * * *